United States Patent [19]
Rossiter

[11] Patent Number: 5,662,251
[45] Date of Patent: Sep. 2, 1997

[54] FISHING HARNESS ADAPTER

[76] Inventor: Geoffrey Rossiter, 446 Watchogue Rd., Staten Island, N.Y. 10314

[21] Appl. No.: 638,648

[22] Filed: Apr. 29, 1996

[51] Int. Cl.$^6$ .................................................. A01K 97/10
[52] U.S. Cl. .......................... 224/200; 224/162; 224/922; 43/21.2
[58] Field of Search ..................... 224/922, 910, 224/257, 258, 162, 200; 43/21.2, 22, 25; D22/147, 148; 24/3.6, 3.13, 298, 265 H, 598.2

[56] References Cited

U.S. PATENT DOCUMENTS

| | | |
|---|---|---|
| 271,713 | 2/1883 | Jones ........................................ 24/598.2 |
| 1,003,696 | 9/1911 | Briggs ....................................... 24/598.2 |
| 1,198,202 | 9/1916 | Drinkard . |
| 1,720,982 | 7/1929 | Van Brunt . |
| 2,079,046 | 5/1937 | Schoeninger ................................ 24/3.6 |
| 2,251,782 | 8/1941 | Coxe ........................................ 224/922 |
| 2,271,136 | 1/1942 | Geiger . |
| 2,499,117 | 2/1950 | Smith . |
| 3,358,399 | 12/1967 | Waldman ................................. 43/21.2 |
| 4,224,722 | 9/1980 | Mikosz et al. ........................... 24/265 H |
| 4,630,763 | 12/1986 | Friedman ................................ 224/910 |
| 4,802,613 | 2/1989 | Tierney ................................... 224/910 |
| 4,828,152 | 5/1989 | Pepping . |

FOREIGN PATENT DOCUMENTS

| | | | |
|---|---|---|---|
| 957345 | 11/1974 | Canada .................................. 224/910 |
| 667935 | 11/1988 | Switzerland ........................... 224/910 |
| 11152 | of 1911 | United Kingdom .................... 43/21.2 |

*Primary Examiner*—Henry J. Recla
*Assistant Examiner*—Gregory M. Vidovich
*Attorney, Agent, or Firm*—Goldstein & Associates

[57] ABSTRACT

A fishing harness adapter which permits the conversion of a fishing harness assembly having dual reel attachment straps into a single reel attachment strap unit, comprising a harness lead assembly, and a reel-eye hub assembly which mates to a fishing reel. The reel-eye hub assembly possesses eye receptacles which receive the eyes of the fishing reel therein. Set screws are then inserted into bores which extend through said eye receptacles, such that said set screws also penetrate the eyes which are positioned within the eye receptacles, thus securing the reel-eye hub assembly firmly to the reel. The dual reel attachment straps of the fishing harness assembly are joined together by a connector affixed to an end of a harness lead line. The opposite end of the harness lead line has a quick release attachment mechanism affixed thereat, which is then secured to a hub flange which protrudes from the reel-eye hub assembly. Accordingly, the two reel attachment straps of the fishing harness assembly are joined into one unit via the harness lead assembly, which is then connected, via a single quick release attachment mechanism to the reel-eye hub assembly which is firmly secured to the fishing reel.

6 Claims, 2 Drawing Sheets

FISHING HARNESS ADAPTER

BACKGROUND OF THE INVENTION

The invention relates to a fishing harness adapter. More particularly, the invention relates to a device which permits an individual engaged in stand-up fishing to fight and land big game fish, using standard fishing rod/reel and harness equipment found on the market, with greater ease, comfort, control and mobility than heretofore experienced.

Big game stand-up fishing generally involves a fisherman employing a fishing rod and reel assembly in conjunction with a back harness and gimbaled rod pad. Such a harness is best evidenced by reference to U.S. Pat. No. 4,828,152, FIG. 1 to Pepping (which is hereafter incorporated by reference). Typically, the back harness extends around and encircles the rear of the fisherman's mid-section. A pair of attachment straps usually extend from each side of the back harness and engage eyes which protrude from the left and right sides of the fishing reel. The gimbaled rod pad is usually suspended below the back harness via a set of adjustable straps, such that the gimbaled rod pad is situated in the fisherman's groin region. An integral socket on the rod belt pad accepts the butt of the fishing rod. Accordingly, three points of attachment are provided between the entire fishing harness adapter worn by the fisherman and the fishing rod and reel assembly.

Upon a fish striking the fisherman's line, the fisherman must have adequate mobility to move around the cockpit area of the vessel unrestricted. At certain moments, in response to the fish surfacing and then diving under the hull of the vessel, the fisherman must have the ability to reach over the transom and/or side rails of the cockpit in order to prevent the fish from diving under the hull of the vessel and ultimately freeing itself. Unfortunately, the pair of attachment straps which secure the back harness to the eyes protruding from the fishing reel are unduly restrictive and prevent the fisherman from obtaining the mobility needed while fighting the fish. Great force is exerted upon the fishing rod as well as the fishing harness assembly, especially upon the socket of the rod-belt pad and the attachment straps, during the struggle with the fish. This force exerted upon the attachment straps prevents the fisherman from quickly pivoting or turning when needed, and hinders his ability to lean over the edge of the transom or side rails of the vessel.

A fisherman engaged in a struggle with a fish and in need of greater mobility could obtain such mobility by quickly disengaging the attachment straps which connect him (via his back harness) to the rod. Unfortunately, the design of fishing harness assemblies present in the art prevents the fisherman from so disengaging, since the fisherman must have at least one hand, and preferably both hands, upon and in control of the rod. Accordingly, it is not possible for the fisherman to disengage the attachment straps which are located at his sides, without releasing at least one of his hands from the rod. This dilemma causes most fishing harness assemblies found in the art to be insufficient for stand-up fish fighting. U.S. Pat. Nos. 4,828,152 to Pepping and 1,720,982 to Van Brunt, for example, disclose these traditional, inadequate types of fishing harness assemblies. While these units may be suitable for the particular purpose employed, or for general use, they would not be as suitable for the purposes of the present invention as disclosed hereafter.

SUMMARY OF THE INVENTION

It is an object of the invention to produce a fishing harness adapter which provides a fisherman with greater maneuverability and flexibility while said fisherman is fighting and attempting to land a fish from a waterborne vessel or land area.

It is a further object of the invention to provide a fishing harness adapter which utilizes one attachment strap rather than two in engaging said harness to the rod and reel assembly, thus permitting the fisherman greater ability to maneuver about the cockpit of a vessel or other area.

It is another object of the invention to produce a fishing harness adapter which allows a fisherman to quickly disengage his fishing harness from his fishing rod and reel assembly as needed, especially in the vicinity of the transom edge and side rails, where it is often necessary for the fisherman to lean over these edges in order to prevent the fish from diving under the hull of the vessel and ultimately freeing itself.

It is a still further object of the invention to produce a fishing harness adapter which can provide all of the above mentioned benefits, while at the same time greatly strengthen the structural integrity of the fisherman's existing fishing reel.

It is a final object of the invention to produce a fishing harness adapter which can be utilized in conjunction with most standard fishing harness assemblies present on the market.

The invention is a fishing harness adapter which permits the conversion of a fishing harness assembly having dual reel attachment straps into a single reel attachment strap unit, comprising a harness lead assembly, and a reel-eye hub assembly which mates to a fishing reel. The reel-eye hub assembly possesses eye receptacles which receive the eyes of the fishing reel therein. Set screws are then inserted into bores which extend through said eye receptacles, such that said set screws also penetrate the eyes which are positioned within the eye receptacles, thus securing the reel-eye hub assembly firmly to the reel. The dual reel attachment straps of the fishing harness assembly are joined together by a connector affixed to an end of a harness lead line. The opposite end of the harness lead line has a quick release attachment mechanism affixed thereat, which is then secured to a hub flange which protrudes from the reel-eye hub assembly. Accordingly, the two reel attachment straps of the fishing harness assembly are joined into one unit via the harness lead assembly, which is then connected, via a single quick release attachment mechanism to the reel-eye hub assembly which is firmly secured to the fishing reel.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
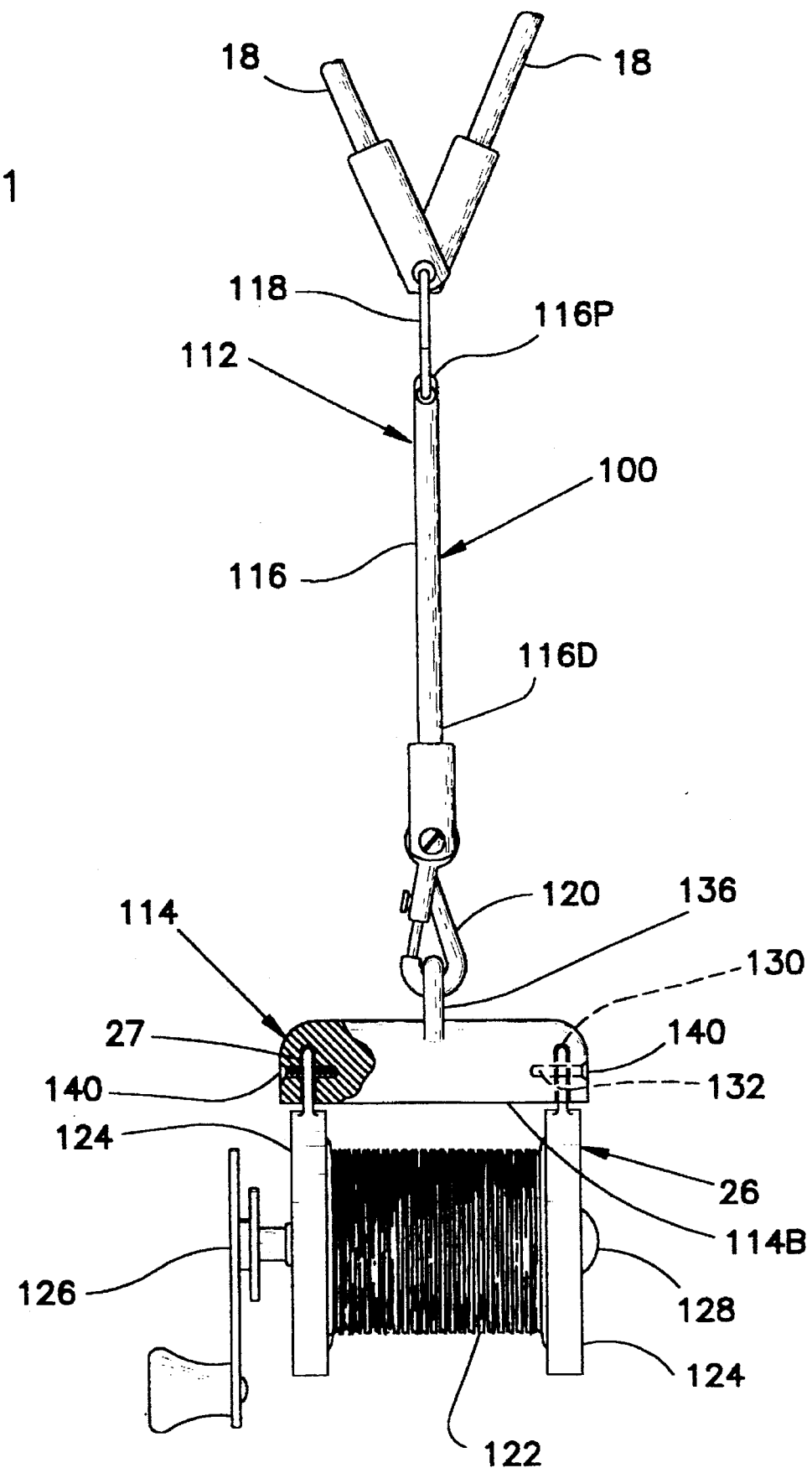
FIG. 1 is a top plan view of the instant invention in use, illustrating the conversion of a standard dual-strap fishing harness assembly into a single-strap unit.

FIG. 1 illustrates a fishing harness adapter 100. The operation and use of said fishing harness adapter 100 will hereafter be discussed throughout in conjunction with FIG. 1 of U.S. Pat. No. 4,828,152 to Pepping, which is incorporated by reference. FIG. 1 of Pepping illustrates a fishing harness assembly 10 worn upon a user. The fishing harness assembly 10 comprises a back harness 14 which extends around and encircles the rear of the fisherman's mid-section. A gimbaled rod pad 34 is suspended below the back harness 14 via a pair of adjustable straps 30, such that the gimbaled rod pad 34 is situated in the user's groin region. An integral socket 50 on the gimbaled rod pad 34 accepts the butt of a fishing rod 28. A pair of reel attachment straps 18, 20 usually extend from each side of the back harness 14 and engage eyes 27 which protrude from the left and right sides of a fishing reel 26.

At certain moments during a struggle with a big-game fish, a fisherman wearing the fishing harness assembly 10 (hereafter referred to as a "user") must have the ability to reach over the transom and/or side rails of a vessel in order to prevent the fish from diving under the hull of the vessel and ultimately freeing itself. Unfortunately, the reel attachment straps 18 which secure the back harness 14 to the eyes 27 protruding from the reel 26 are unduly restrictive and prevent the user from obtaining the mobility needed while fighting the fish. Great force is exerted upon the fishing rod 28 as well as the fishing harness assembly 10, especially upon the socket 50 of the rod pad 34 and the reel attachment straps 18 during the struggle with the fish. This force exerted upon the reel attachment straps 18 prevents the user from quickly pivoting or turning when needed, and hinders his ability to lean over the edge of the transom or side rails of the vessel.

Greater mobility could be obtained by the user by quickly disengaging the reel attachment straps 18. Unfortunately, the design of fishing harness assemblies present in the art prevent the user from so disengaging, since he must have at least one hand, and preferably both hands, upon and in control of the rod 28. Accordingly, it is not possible for the user to disengage the reel attachment straps 18 which are located at his sides, without releasing at least one of his hands from the rod 28. Such a task can be performed, however, by utilizing the fishing harness adapter 100, as discussed below.

Figure 4:
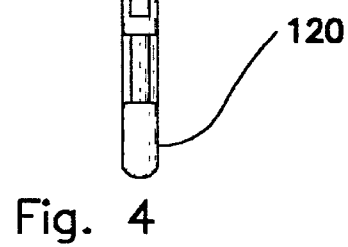
FIG. 4 is a side view of the harness lead line with a quick release attachment mechanism secured at one end and junction ring secured to an opposite end therefrom.

The fishing harness adapter 100, as illustrated in FIG. 1, comprises two main assemblies—a harness lead assembly 112 and a reel-eye hub assembly 114. The harness lead assembly 112, as seen in FIGS. 1 and 4, comprises a harness lead line 116 having opposite ends 116D and 116P. A junction ring 118 is secured to the end 116P of the harness lead line 116. Said junction ring 118 is hinged at a point along its circumference and fragmented at an opposite location along the circumference such that it may be easily opened to accept reel attachment straps 18, and then closed to retain said reel attachment straps 18 thereat as shown in FIG. 1. A quick release attachment mechanism 120 is secured to an opposite end 116D of the harness lead line 116. The quick release attachment mechanism 120 is mounted to the end 116D of the harness lead line 116 such that it can rotate 360 degrees and pivot with respect to said harness lead line 116.

Figure 2:
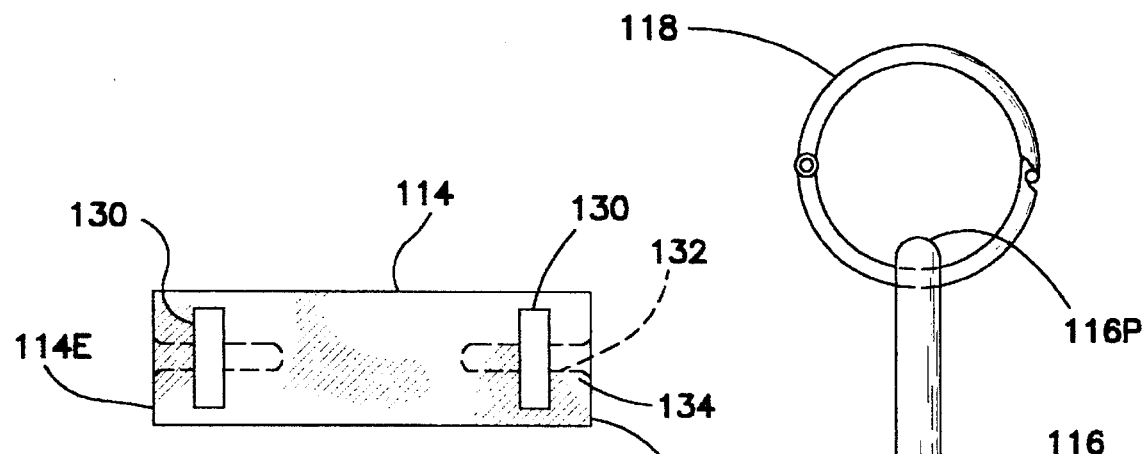
FIG. 2 is a bottom plan view of the reel-eye hub assembly of the instant invention.
Figure 3:
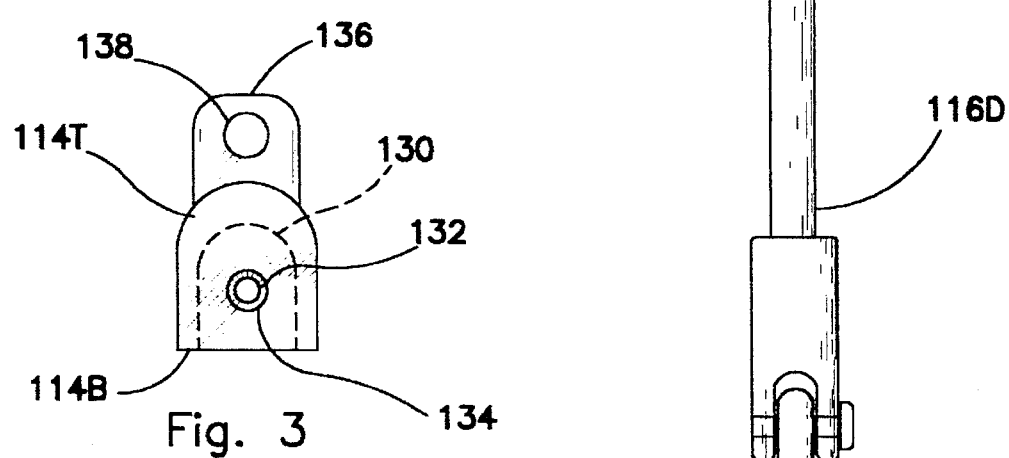
FIG. 3 is a side view of the reel-eye hub assembly with the hub flange protruding upwards therefrom.

The reel-eye hub assembly 114 mates with the reel 26 as indicated in FIG. 1. As there illustrated, the typical reel 26 comprises a spool 122 (around which fishing line is wound) sandwiched between a pair of side plates 124. A crank 126 causes the rotation of the spool 122 about a central hub 128. Eyes 27 protrude outward from the side plates 124, said eyes 27 intended to be mated with the pair of reel attachment straps 18 as discussed above. FIG. 2 illustrates a bottom plan view of the reel-eye hub assembly 114, and FIG. 3 a side view thereof. The reel-eye hub assembly 114 has a top 114T and a bottom 114B, and eye receptacles 130 extending from the bottom 114B towards the top 114T. Said eye receptacles 130 are of a depth sufficient to receive and accommodate standard sized eyes 27 of a reel 26. Bores 132 extend inward from side edges 114E of the reel-eye hub assembly 114, penetrating the eye receptacles 130. A counterbore 134 permits any fastening screws or bolts 140 which are inserted into the bore 132 to sit flush with the side edge 114E of the reel-eye hub assembly 114 so as to avoid the entanglement of fishing line thereat. Finally, a hub flange 136 protrudes out from the center of the reel-eye hub assembly 114, as seen in FIGS. 1 and 3. Said hub flange 136 has an aperture 138 located thereat.

The reel-eye hub assembly 114 is installed upon the fishing reel 26 as seen in FIG. 1. The bottom 114B faces the spool 122 of the reel 26, and the eyes 27 of the reel 26 are received within the eye receptacles 130. The set screws or bolts 140 are threaded into the bores 132 and through the eyes 27, thus securing the reel-eye hub assembly 114 to the reel 26. In addition to firmly securing the reel-eye hub assembly 114 to the reel 26, this method of installation also serves to add increased rigidity to the reel 26 by allowing the reel-eye hub assembly 114 to act as a brace between the side walls 124 of the reel 26.

While wearing a standard fishing harness assembly 10, a user simply joins both reel attachment straps 18 to the end 116P of the harness lead line 116 via the junction ring 118. The opposite end 116D of the harness lead line 116 is then fastened to the reel-eye hub assembly 114 by connecting the quick release attachment mechanism 120 to the hub flange 136. Accordingly, the user is not encumbered by a dual strap system while fighting big game fish, and may quickly release the reel attachment straps 18 from the reel 26 with only one hand by disengaging the quick release attachment mechanism 120 from the hub flange 136. Since one of the user's hands is typically in the vicinity of the reel 26 and more specifically the crank 126, it is extremely simple to disengage the quick release attachment mechanism 120 which is located adjacent to the crank 126.

What is claimed is:

1. A fishing harness adapter, for converting a fishing harness assembly having dual reel attachment straps into a single reel attachment strap unit and for converting a fishing reel having a plurality of eyes which provide respective attachment points for the dual reel attachment straps into a single attachment point for the single reel attachment strap unit comprising:

a) a harness lead assembly adapted to permit the dual reel attachment straps from the fishing harness assembly to be joined into a single reel attachment strap; and b) a reel-eye hub assembly adapted to mate to a plurality of eyes of the fishing reel and allow the harness lead assembly to be secured to the fishing reel, comprising a top, a bottom, eye receptacles for receiving the eyes of the fishing reel extending from the bottom toward the top transverse to the length of the reel-eye hub assembly, side edges, bores extending inward toward the center from the side edges, set screws which are inserted into the bores and through the eyes which are located in the eye receptacles, and a hub flange protruding out from the center of the top of the reel-eye hub assembly for engaging the harness lead assembly.

2. The fishing harness adapter of claim 1, wherein the harness lead assembly comprises a harness lead line having opposite ends, a connector for joining the reel attachment straps of the fishing harness assembly located at one of said ends, and a quick release attachment mechanism for connecting the harness lead assembly to the reel-eye hub assembly, located at the opposite end therefrom.

3. The fishing harness adapter of claim 2, wherein the connector comprises a junction ring which is hinged at a point along its circumference and fragmented at an opposite point therefrom along the circumference, such that said junction ring may be opened to accept the reel attachment straps of the fishing harness assembly and closed to retain said reel attachment straps therein.

4. The fishing harness adapter of claim 3, wherein the eye receptacles are of a sufficient depth to fully accept the eyes of the fishing reel.

5. The fishing harness adapter of claim 4, wherein a counterbore extends partially into each of the bores from the edge of the reel-eye hub assembly, such that when the set screws are respectively inserted into said bores, each of the set screws can sit flush with the edge of the reel-eye hub assembly to prevent fishing line from getting snagged or entangled thereat.

6. A method of converting a fishing harness assembly having dual reel attachment straps into a single reel attachment strap unit and converting a fishing reel having a plurality of eyes which provide respective attachment points for the dual reel attachment straps into a single attachment point for the single reel attachment strap unit with the use of a fishing harness adapter, comprising the steps of:

a) inserting the eyes of the fishing reel into eye receptacles of a reel-eye hub of the fishing harness adapter;

b) inserting set screws into bores which extend from the sides of the reel-eye hub of the fishing harness adapter, such that said set screws extend through the eye receptacles and eyes contained therein, thus firmly securing the reel-eye hub to the fishing reel;

c) securing the dual reel attachment straps of the fishing harness assembly to a connector of a harness lead assembly thereby forming the single reel attachment strap unit; and d) securing an end of the harness lead assembly located opposite the connector to a flange protruding from the reel-eye hub.

\* \* \* \* \*